3,639,583
BIOCIDAL ELASTOMERIC COMPOSITIONS
Nathan F. Cardarelli, Copley, and Harry F. Neff, Medina, Ohio, assignors to The B. F. Goodrich Company, New York, N.Y.
No Drawing. Continuation-in-part of application Ser. No. 515,154, Dec. 20, 1965. This application June 28, 1968, Ser. No. 741,223
Int. Cl. A01m 9/38; A61k 27/12
U.S. Cl. 424—125
15 Claims

ABSTRACT OF THE DISCLOSURE

A vulcanized elastomeric composition comprising an organic elastomer, an organic toxicant dissolved therein, and selected proportions of compounding ingredients including carbon black, wax, fillers, etc., and vulcanized to an intermediate degree are biocidal materials having a low, controlled and tailor-made rate of toxicant release for long-extended biocidal activity. Organic elastomers employed are natural rubber, neoprene, nitrile rubbers, butyl, SBR, polybutadiene, etc. Organic toxicants appreciably soluble in such elastomeric composition for such use include the organo-tin compounds, nitrosalicylanilide compounds, chlorinated hydrocarbons, organo-phosphorous compounds, etc. Such compositions are useful in sheet-like coverings thicker than about 0.05 inch for antifouling protection of submerged marine structures; as larvacides in the form of pellets, chunks, sheets, strips, tapes, etc., which on immersion in infested water or air liberate toxicant killing the adult, larvae and egg forms of mosquitos, midges, black flies, schistosome cercariae and their snail hosts, other gastropods, and other disease-causing and/or disease transmitting organisms and insect pests; as bacteriocidal, fungicidal and algicidal surfaces and coverings; and an animal- and insect-repellants. Certain ingredients of elastomer and vulcanizable rubber compositions, notably fatty acid materials, very materially enhance biocidal efficiency of compositions containing the organo-tin compounds.

CROSS REFERENCES TO RELATED APPLICATIONS

This application is a continuation-in-part of applicants' co-pending application, U.S. Ser. No. 515,154, now abandoned, filed Dec. 20, 1965 and of the co-pending sole application of Nathan F. Cardarelli, U.S. Ser. No. 616,187 filed Feb. 15, 1967, now U.S. Pat. No. 3,417,181, the latter being a continuation-in-part of the earlier application Ser. No. 528,785, filed Feb. 21, 1965, now abandoned. The present application is drawn to biocidal elastomeric compositions whereas Ser. No. 616,187 is drawn to a method of employing certain biocidal elastomeric compositions in combatting certain disease-transmitting and disease-causing water-borne organisms.

SUMMARY OF THE INVENTION

The present invention relates to special biocidally-active vulcanized elastomeric compositions which exhibit resistance to fouling by contact with sea water, which are effective in water, air or other environment as larvacides, fungicides, algicides, and bacteriocides, which may be used as such or coated on fabrics to be used as insect-, bacteria-, fungus-, and animal-resistant and/or repellent clothing, coverings, shields, and other protective apparatus. Such biocidal elastomeric (or rubber) compositions contain an organic toxicant dissolved in a vulcanized rubber matrix specially compounded and cured in such a fashion that such toxicant remains soluble and sufficiently mobile in the matrix as to diffuse to the surface of the matrix at a selected controlled rate and to be released therefrom into its environment by molecular release at a rate adapted best to carry out the biocidal application.

BACKGROUND OF THE INVENTION

One of man's more ancient technical problems has been in retarding the growth of marine organisms on seawater immersed objects such as ship hulls, docks, piers, buoys, etc., and the cleaning or removal of incrustations of these and other marine fouling genera. Until the early part of this century, practical antifouling techniques had not varied appreciably since the Phoenicians and their contemporaries discovered that fouling of ship bottoms is retarded by cladding ship hulls in copper sheets, or by paints containing salts or compounds of copper, mercury or arsenic which poison some of the more objectionable fouling genera. Even at this time marine fouling is a national burden estimated to cost the nation about 700 million dollars a year.

Certain organotin compounds which are toxic or repellent to a very wide spectrum or marine fouling organisms have recently been proposed as a poisonous additive in acrylic and vinyl polymer paint vehicles to provide improved antifouling paints. Even though these vehicles are known to possess excellent resistance to chemical degradation in sea water, the organotin toxicants are insoluble in them and are rapidly dissipated from the immersed paint coating so that the effective life of such improved antifouling paints is about of the same order as other older antifouling paints with less effective toxicants.

In more recent years, the efforts to retard marine fouling still have been focused on the development of improved paint vehicles for dispersing the familiar copper, mercury, organotin and arsenic compounds or other known antifouling toxic chemicals. All known antifouling paint compositions function through leaching or exfoliating mechanisms. The leaching types depend upon porosity in the paint coating to make fresh toxicant available with the result that very, very high toxicant loadings need be employed for any significant useful service life, for example, loadings of cuprous oxide of 85%/wt. or more and loadings of 30 to 40%/wt. or organotin type toxicants are commonly employed. Similarly, exfoliating type paints function by a sloughing off or chipping away of the surface of the paint film so as to expose fresh antifoulant material. X-ray diffraction analysis of the leaching type paint films shows that a toxicant gradient exists in the paint film. Antifouling efficiency aside, many of the known antifoulant paints because of their necessary porosity or exfoliation behavior and high toxicant loadings, inherently lack durability and integrity as paints. As a result, even though organotin type toxicants are known to be highly toxic to a very wide spectrum of marine fouling organisms, their effective toxic life in even the best vinyl and acrylic polymer paint vehicles is of necessity limited, as indicated above.

People by the millions suffer and die each year from malaria, yellow fever, schistosomiasis and similar dread diseases caused by or spread by water-spawned or water-carried organisms. While numerous toxicants are known for killing these disease-causing and disease-propagating organisms, there are many reasons why their use has not lead to the elimination of these dread diseases. For example, the use of DDT against the mosquito has not been too effective because of great expense, limited effective life requiring frequent re-applications, the development of DDT-resistant strains of mosquito, and widespread controversy over real or imaginary toxic effects on human and other animal and vegetable life, particularly on our wild animals, birds and fish. By and large, these pests have been combatted by direct application to the infested water of the pure toxicant or of the toxicant on or in a diluent carrier. This has resulted in very limited periods of effectiveness (i.e. measured in from days up to 6 weeks in stagnant water; much less in even slowly flowing water) necessitating frequent re-application. DDT, oils and other mosquito larvacides are applied as often as twelve times a year in some areas of the southern United States. Applied in this fashion over any period of years, the total dosage of toxicant is enormous and never 100% effective. Also, direct application of toxicant may lead to at least temporary high local concentrations due to poor dispersion, which concentration can be very toxic to other forms of life. This is also highly inefficient and wasteful since many of the best toxicants have very limited solubility in water (i.e. below about 50 p.p.m. by weight) and their lethal larvacidal levels are at least a decade or two below water solubility levels.

Also, conventional larvacides or insecticides such as DDT, the organo-phosphates, arsenic, etc., are very dangerous to store, distribute and prepare and handle for application since in the form handled, the toxicant concentration often is very high. DDT, malathion, parathion, etc., on finely-divided inert-type carriers, for example, are very dusty and mobile and there have been horrible instances of multiple human deaths traceable to foodstuff contamination in warehouses. Also as indicated previously, these known toxicants must be used with great care and by skillful people to avoid poisoning of the application personnel and of water (i.e. poisoning to the extent it would be unfit and dangerous for use by humans, cattle, fish and other desirable marine and bird life). Oiling a stagnant pond or swamp to kill mosquito larvae may be effective against the larvae for as much as three to six months but the usefulness of the water as a source of potable water for humans and animals and the use of the pond for fish or recreation may be impaired for much longer periods. Such treatment on moving water is ineffective.

Certain nitrosalicylanilide compounds, particularly the alkanolamine salts of nitrosalicylanilides, have been established as highly effective gastropodicides effective against schistosome cercariae (and other "flukes") and their snail hosts. Limited use has been made of these valuable toxicants in combatting the dread debilitating and killer disease of schistomiasis because of the expense of application and limited period of effectiveness when the toxicant is directly metered into infested water. Once such addition ceases, the snail population soon recovers to its original density since a certain proportion of the snail population is always out of water. As a result, schistosomiasis is the world's second worst killer disease estimated to kill about six million people per year in the world and impair the efficiency of as many as 200 to 300 million people at a time. Puerto Rico, in spite of intensive public health measures, is estimated at times to suffer infection of one in ten of its population. Infection is estimated to reach 75% of total population in some less-developed countries. Schistosomiasis is especially high in children because of their proclivity for swimming in infested waters.

There is a great need, therefore, for improved biocidal compositions which are safer, more efficient, longer-lived, capable of more controlled application, and which can be stored, handled and applied effectively and safely by less skillful people.

DESCRIPTION OF THE INVENTION

According to this invention, we have discovered that a vulcanized or cured elastomeric composition based on an organic, vulcanizable elastomer containing a biocidal organic toxicant dissolved therein and compounded and cured so as to exhibit controlled release of the toxicant are a unique class of materials capable of numerous biocidal applications such as long-lived antifouling coatings and sheathings on marine surfaces, as larvacidal and insecticidal carriers which effect on immersion in air and water molecular release of the organic toxicant into the air, water, or other environment at controlled rates thereby making it possible to maintain in such environment the lowest lethal biocidal levels over very long periods, as animal and insect repellant surfaces and coatings, and as bacteriostatic, fungicidal, and algicidal coatings or surfaces equally effective for long periods.

More specifically, the biocidal elastomeric compositions of this invention are special rubbery compositions in which both the concentration of biocidal toxicant dissolved therein, on the one hand, and the proportion of certain types of compounding ingredients and the state of cure or vulcanization on the other, are balanced or adjusted, as to provide, when vulcanized, a rubbery elastic matrix in which the organic toxicant remains appreciably soluble and sufficiently mobile as to diffuse to the surface of the composition at a rate at which it is removed from the surface and which is finite, low and selected for the intended biocidal application. Such surface toxicant is released to the environment, particularly in water, by molecular release.

The release of toxicant by molecular release is by far the most efficient in a statistical and biocidal sense and, with the biocidal rubbers of this invention, usually, is several orders of magnitude slower than any other known release mechanism. Prior art methods involving direct application of the pure or merely physically-diluted forms of toxicants such as, for example, in the form of fog-like droplets of toxicants most of the effective agent in the droplet is unavailable and, statistically, the chances of direct contact of the droplet with the target pest are low. Much lower concentrations of the same toxicant released over longer periods by molecular release puts the released toxicant to work at the desired interface in its most active and economical form.

Molecular release at low levels by means of these biocidal rubbers may permit the use of many organic toxicants of known high biocidal activity, but which are known to hydrolyze or oxidize or which are easily absorbed or destroyed too rapidly to be useful for direct application. The rubber matrix holds such materials in solution and protects such toxicants until after release and, even though the biocidal activity of released material quickly dissipates, such is quickly renewed and sustained over long periods.

Molecular release of toxicant also permits for the first time a new and practical type of attack on many types of disease-causing and/or disease-transmitting pests. Heretofore, many of such pests such as mosquitos, midges, flies, schistosome cercariae, etc., have been attacked in the adult or larvae forms of the host pest employing the large dosages of toxicants required. We have found that toxicants in dissolved molecular form are capable of killing the very young pest or larva form thereof and often preventing the hatching of the eggs of the same pests at concentrations one or two decades or more below the concentrations required for the more adult form of the same pest. In the case of schistosome cercariae and their snail hosts, we have found that the snail is very difficult to kill whereas the actual disease vector, schistosome cercariae per se, are killed in a few minutes by organotin or nitrosalicylanilide type toxicants at concentrations estimated to be of the order of a few p.p.b. (parts/wt./billion), whereas to kill the adult Australorbis and Japonicus type snail hosts requires contact of hours with concentrations up to 1 p.p.m. (parts/wt./million) or more.

We have also observed that certain pests succumb or are irreparably harmed on long-continued exposure to some well-known toxicants and at concentrations so low as not previously thought fatal. For example, snails exposed to organotin compounds but counted as still alive or at least not dead after the usual 24 hour observation period are found even when placed in clean, non-toxic water either to die or remain moribund for many days after exposure. It may be necessary, therefore, to reassess the use of toxicants by measuring biocidal activity, not on the 24 hour/100% kill basis now current, but on exposure for 7, 10 or 30 days and longer and continuing the death count for at least an equal period of time. Thus, since it is possible quickly to kill schistosome cercariate at very low concentrations of below 1 p.p.b. and by virtue of the biocidal rubbers, it is now possible to maintain such low toxicant levels over months and even years, it may be possible to stamp out schistomiasis and prevent re-infection in a given area for long periods while permitting snails to live. Such an approach is certain to create less toxicity to fish, cattle, humans and other forms of life.

EFFECT OF COMPOUNDING INGREDIENTS

We have found that high structure (reinforcing) carbon blacks, petroleum waxes, and many of the other filler and lubricant type of ingredients normally added in the compounding of rubber have the effect of reducing the rate of diffusion of organic toxicants dissolved in the vulcanized matrix. In general, the biocidal rubbers of this invention contain lower levels of total compounding ingredients than those commonly employed in the same base elastomer intended for high-stress, non-biocidal applications of the rubber. For example, whereas 40 to 100 parts/wt. or more of a high structure carbon black per 100 parts/wt. of base elastomer (hereinafter "phr.") commonly are utilized in such high-stress applications as automobile tire treads, the compositions of this invention will generally be below this level of carbon black, although the level required seems to be dependent mostly on the particular base elastomer, the degree of structure in the black itself, and the ability of the matrix to dissolve the particular toxicant in question. For example, neoprene rubber appears to require less carbon black for diffusion control than most other rubbers. Carbon black levels of from about 5 to about 35 phr. (more preferred from about 10 to about 35 phr.) seem to produce a very wide range of release rate with neoprene. Natural rubbers, SBR, nitrile rubbers and butyl rubbers, require somewhat more carbon black for low release rates. From about 30 to about 55 phr. seem required in the latter rubbers. EPDM rubber appears anomalous in requiring very high carbon black levels of from about 65 to about 100 phr. Not all carbon blacks are effective in controlling toxicant diffusion for we have found that only the higher structure carbon blacks (i.e., having oil absorptivities of 9 gals./100 lbs. or more) are effective. With carbon blacks of lower oil absorptivity (i.e., lower structure) it is not ordinarily possible to achieve low toxicant release (diffusion) rates at practical carbon black loadings. With the formulations which would require the higher carbon black levels, the use of from about 1 to about 7 phr. of petroleum wax is recommended since the proportion of carbon black can be reduced. It appears that with most elastomers and most toxicants from 5 to about 85 phr. of carbon black is a good practical operating range with from about 10 to about 55 phr. being more preferred. Toxicant loadings above about 10 phr. will usually require at least 20 phr. of carbon black and up to about 50 to 70 phr. for low toxicant release rates.

With the above proportions of carbon black and other compounding ingredients employed with most base rubbers, it follows that the biocidal elastomeric compositions of this invention will have a specific gravity at 25° C. greater than about 1.0. In antifouling applications and in many other biocidal applications where the rubber is supported or employed in an environment other than water, the effect of density of the rubber is of little moment. However, in many larvicidal applications carried out in water, these biocidal compositions will sink and this is an advantage in destroying snails (which move throughout a body of water) and other scavenger or bottom-favoring pests or larvae and in all larvicidal applications carried out in moving waters since the toxicant is and must be released throughout the body of water to be effective in such applications.

When it is desired to employ a toxicant loading which is above the intrinsic solubility of the toxicant in the matrix and/or difficulties in mixing are encountered due to such high toxicant loadings, a phenolic (i.e., phenol/formaldehyde) resin may be employed in the form of "microballoons" or "micro-spheres" to absorb and hold the excess toxicant. From about 20%/wt. to about 100%/wt. of the phenolic resin based on the weight of toxicant can be employed in this manner without undue loss of vulcanizate physical properties and while otherwise controlling the toxicant release rate. Even though bis(tributyl tin) oxide is soluble in neoprene rubber to the extent of only about 9 to 10%/wt. based on the raw rubber, the use of these amounts of microspheres makes it possible to employ up to 15 phr. or more of TBTO in neoprene with very little other changes in the recipe and with an effective biocidal life measured in years.

As indicated, we have also found that petroleum waxes of the type normally employed in rubber compounding for lubricity and antioxidant activity have a relatively strong suppressing effect on toxicant diffusion or toxicant release rate. However, one is limited in the proportion of wax that can be incorporated into rubber by ordinary mixing techniques to the range of up to 7 phr. The use of from about 1.5 to about 5 phr. of such wax, in any given composition, will contribute very materially increased biocidal life to the composition. We prefer to employ both carbon black and wax in any formulations in which very long biocidal life is desired.

Other filler and/or lubricant-type compounding ingredients are of lesser effect than carbon black and wax but nevertheless reduce toxicant release at higher loadings and must be taken into account when designing a formulation. In general, total loadings, other than carbon black and wax, should be below about 20 phr.

We have also found that certain ingredients of sulfur vulcanization systems, notably the $C_{10}$ to $C_{18}$ fatty acids normally added as vulcanization accelerators and dispersants or normally present in the elastomer, apparently either react or cooperate in some manner with the organotin toxicants during vulcanization so that the biocidal activity and efficiency of the composition is relatively greater than can be attributed to the amount of original toxicant added. We have found that, of the fatty acid materials, lauric acid, palmitic acid, and oleic acid are very effective, with palmitic acid having greatest apparent activity. Laboratory bench scale tests have confirmed that bis-(tributyltin) oxide reacts with these fatty acids. From about 0.5 to about 10 phr., more preferred from about 1 to about 8 phr., of these fatty acids are useful to secure increased biocidal activity with the organotin toxicants.

EFFECT OF STATE OF CURE

Also, we have found that both the more highly vulcanized biocidal rubbers and the corresponding unvulcanized forms thereof are of markedly lower biocidal effectiveness than are the specimens cured to intermediate levels of cure. The reason for this is not understood. Fortunately, high or highest biocidal activity for a given composition usually is obtained at a state of cure not too far removed from that known to produce optimum vulcanizate physical properties with the particular base rubber, compounding recipe and the vulcanization system employed. The state of cure is unaffected by the toxicant so that known vulcanization systems, techniques and equipment may be employed in the known manner to obtain the desirable state of cure for any given formulation.

The compositions of this invention may employ any of the known vulcanization systems including all of the sulfur vulcanization types, metal oxide cures, peroxide cures, amine cures, etc. It is preferred, to employ sulfur vulcanization systems because these are inexpensive, they are simple and well understood, and appear to offer the most desirable biocidal vulcanizates.

As between the effects of compounding ingredients and state of cure, the effects of the former on toxicant release is the stronger and is more easily subject to greater variation.

ORGANIC TOXICANT

By the term "organic toxicant" is meant a toxicant compound carrying in its chemical structure sufficient of chemically-bound organic groups as to render the toxicant soluble to the extent of from about 0.02% to about 20%/wt. in the "organic vulcanizable elastomer," as the latter is defined below. More preferred toxicants have, in addition, low volatility in air and low solubility in natural waters. The toxicant should have a boiling point in excess of about 150° C. and most preferably in excess of about 200° C.

The preferred toxicants should have a solubility in natural waters (i.e. water containing some "hardness") below about 50 p.p.m., more preferably below about 30 p.p.m., and most preferably not more than about 2 to 10 p.p.m. The exact nature of the toxicant having these properties is not too important since the choice will be dictated primarily by the target pest to be killed, controlled or repelled.

Particularly effective toxicants are the organotin compounds of the formula $R_3SnX$ (see definition below), the nitrosalicylanilide compounds and their salts, the organo-phosphorous, and the chlorinated hydrocarbons.

In the formula $(R_3Sn)_nX$, $n$ is a number from 1 to 3 (intermediate numbers indicate mixtures), R is an alkyl or aryl group and X is a substituent radical selected from the class consisting of sulfide, oxide, halogen such as chloride, bromide, and fluoride, chromate, sulfate, nitrate, hydroxide, acetate, fatty acid groups such as acetate, octanoate, laurate, neodecanoate, rosinate (or resinate), dimethyl dithiocarbamate, naphthenate, paravinyl benzoate, acrylate, methacrylate, iso-octylmercaptoacetate, hydride or methoxide. Preferred R groups are alkyl groups containing from 3 to 8 carbon atoms. The butyl group seems to maximize toxicity of the tin compounds. Preferred X groups are oxide, sulfide or a halogen. A particularly effective member of the latter preferred class is bis(tri-n-butyl tin) oxide ("TBTO"). Other highly effective compound is bis(tri-n-butyl tin) sulfide ("TBTS") and tributyl tin fluoride ("TBTF").

Typical examples of other organotin compounds useful in the biocidal rubber compositions of this invention are bis(tri-n-propyl tin) oxide, tri-n-propyl tin chloride ("TPTC"), triisopropyl tin chloride, bis(triamyl tin) oxide, triisobutyl tin chloride, tributyl tin acetate, tributyl tin chloride, triphenyl tin chloride, tributyl tin laurate, tributyl tin adipate ("TBTAd"), tributyl tin chromate bis-(tributyl tin) maleate, tributyl tin neodecanoate, bis-(tri-n-butyl tin) phthalate, amyl diethyl tin chloride, butyl dipropyl tin chloride, bis(tri-n-butyl tin) sulfate, phenyl dibutyl tin chloride, tributyl tin resinate ("TBTR"), tributyl tin isooctylmercaptoacetate, bis(tri-n-butyl tin) phosphite, triphenyl tin benzoate, tributyl tin dimethyl dithiocarbamate, the TBTO ester of 2-mercaptobenzothiazole, tributyl tin naphthenate, and others.

Another highly preferred class of toxicants for use in the biocidal rubber compositions of this invention are the salicylanilides and their derivatives including their alkali-metal and alkanol amine salts such as are described in U.S. Pats. 3,079,297, 3,113,067 and 3,238,098. One particular toxicant of this class known commercially as "Bayluscide" (TM Bayer) has been found particularly effective in the biocidal rubbers of this invention. The latter material is said to be the 2-aminoethanol salt of 5,2'-dichloro-4'-nitrosalicylanilide and has achieved at least provisionally acceptance by public health authorities in some countries.

The salicylanilide type toxicants most useful in the biocidal rubbers of this invention have the formula

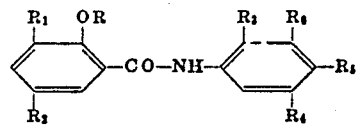

wherein R is hydrogen or a lower alkanoyl radical having 1 to 4 carbon atoms, $R_1$ is hydrogen or methyl, $R_2$ is a halogen such as chlorine, bromine or fluorine, $R_3$ and $R_4$ are hydrogen, methyl, or a halogen, or a nitro group, $R_4$, $R_5$ and $R_6$ are hydrogen, halogen or a nitro group and wherein always the compound contains only one nitro group and at most three halogen substituents.

Illustrative toxicants having the above formula are 5,2'-dichloro-4',5-chloro-4'-nitrosalicylanilide,
5-nitro-4'-chlorosalicylanilide,
5,3',5'-trichloro-2'-nitrosalicylanilide,
5,2',5'-trichloro-3-methyl-4'-nitrosalicylanilide,
5,3'-dichloro-4'-nitrosalicylanilide,
5,4',6'-trichloro-2'-nitrosalicylanilide,
5'-dichloro-4'-nitrosalicylanilide,
5-bromo-2',
5,2',5'-trichloro-4-nitro-2-acetoxybenzanilide,
5,2'-dichloro-5'-trifluoro-methylsalicylanilide, and the alkali-metal and alkanolamine salts of the above and still other compounds of the above formula. Preferred nitrosalicylanilide compounds are the alkanolamine salts.

Organo-phosphorous compounds which may be employed are "Malathion" (O,O-dimethyl phosphorothioate or diethyl mercapto-succinate) (American Cyanamid Co.), "Dasanit" (Chemagro Corporation, Kansas City, Mo., a sulfinyl phosphorothioate $(C_2H_5O)_2PSOC_6H_4SOCH_3$); "Dursban" (Dow Chemical Company, O,O-diethyl-0,3,5,6-trichloro-2-pyridyl-phosphorothioate); tributyl-tin phosphate; "DBTP," bis(tributyl tin) phosphate; "Abate," O,O,O',O'-tetramethyl-O,O'-thiodi-p-phenylene phosphorothioate (Cyanamid); O,O-bis(p-chlorophenyl)acetimidazolyl phosphoramidoiodate; tributyl phosphorothioate, "Baytex" (Chemagro Corp., O,O'-dimethyl-O-[(4-methylthio)-m-tolyl]phosphorodiate, and many others.

Chlorohydrocarbons such as "Chlordane" (Velsicol Chem. Corp.; octachloro-4,7, methano-tetrahydroindane); "Heptachlor" (Velsicol Chem. Corp.; heptachloro-4,7-methanotetrahydroindane); "Dichlone" (Aceto Chemical; 2,3-dichloro-1,4-naphthoquinone); "Lindane" (City Chemical; hexachlorocyclohexane); and many others.

The preferred organic toxicants for use in this invention are the organotin compounds and the nitrosalicylanilide compounds.

TOXICANT CONCENTRATION

In general, the biocidal rubber compositions may contain anywhere between about 0.02 to about 20 parts/wt. of toxicant per 100 parts/wt. of base elastomer in the composition (hereinafter "phr."). Where the upper limit exceeds the intrinsic solubility of the toxicant in the base elastomer, slightly increased proportions of carbon black, wax and/or other fillers and special additives (phenolic resin micro-spheres) can be employed to absorb and hold the excess toxicant. More practical concentrations are between about 0.2 to about 15 phr. of toxicant and for longest-lived biocidal effects between about 4 and about 12 phr. The concentration chosen will depend on the biocidal application and the biocidal longevity required. For antifouling applications of organotin toxicants, the concentration will usually be in the range of from about 1 to about 15 phr., with from about 4 to 12 phr. being preferred. For larvacidal, algecidal, fungicidal and bacteriostatic applications the choice of concentration will cover almost the entire range depending on the application, although a generally effective range is from about 2 to about 12 phr.

Toxicant concentration can also be expressed in terms of the toxicant concentration released to the environment. For example, Bayluscide is said to exhibit a solubility in distilled water of 230 p.p.m.±50 (by weight) and less than this in hard waters. The organotin compounds usually exhibit a solubility below 50 p.p.m. in natural waters. As indicated, biocidally lethal concentrations usually are well below the water solubility level.

ORGANIC ELASTOMER

The term "vulcanizable organic elastomer" means any vulcanizable elastomer or rubbery material whose structural backbone consists of carbon-to-carbon chains, although such structure may contain non-hydrocarbon substituents (i.e. halogen and nitrile groups) or pendant groups (as contrasted with a silicone rubber having a backbone of O—Si—O repeating units); and which is vulcanizable or curable from the thermoplastic to the elastic condition.

By "vulcanizable to an elastomeric condition" is meant an ability of the rubber to be converted from a thermoplastic to an essentially elastic condition by any of the many mechanisms including, but not limited to, sulfur-vulcanization, metal-oxide curing systems, peroxide curing systems, amine curing systems, curing through metal-carboxylate linkages, and many others.

Thus, there may be utilized natural rubber, neoprene (polychloroprene) rubber; butyl (isobutylene/isoprene copolymer) rubber; SBR (styrene/butadiene rubbers); polybutadiene rubbers such as cis-polybutadiene rubber; synthetic polyisoprene rubbers such as cis-polyisoprene or synthetic natural rubber; nitrile rubbers (butadiene/acrylonitrile copolymers); ethylene/propylene copolymer rubbers; EPDM rubbers (ethylene/propylene/dicyclopentadiene and other ethylene/propylene/diene terpolymers); and others.

The miscibility or solubility of the organic toxicants such as organotin compounds and nitrosalicylanilide toxicants in the above (raw or uncompounded) rubbers is appreciable, as will appear below:

| Rubber | Toxicant | Solubility percent/wt.[1] |
|---|---|---|
| Neoprene | TBTO [2] | 9.5 |
| Do | "Bayluscide" [3] | 15+ |
| Natural | TBTO | 11 |
| Do | "Bayluscide" | 10 |
| SBR | TBTO | 7 |
| EPDM | TBTO | 8.5+ |
| Nitrile :[4] | | |
| 18% acrylo | TBTO | 15+ |
| 22% acrylo | TBTO | 12 |
| 26% acrylo | TBTO | 8+ |
| 33% acrylo | TBTO | 7+ |
| 40% acrylo | TBTO | 4+ |
| 52% acrylo | TBTO | 0.1 |

[1] Determined by a laboratory immersion procedure.
[2] "TBTO" is bis(tributyl tin) oxide.
[3] "Bayluscide" a trademarked product of Farbenfabriken Bayer A.G., W. Germany distributed by Chemagro Corp. of Kansas City, Mo., and said to be the 2-aminoethyl salt of 2',5-dichloro-4'-nitrosalicylanilide.
[4] Butadiene/acrylonitrile copolymer rubbers of indicated combined "acrylo" (acrylonitrile) content.

It should be noted that except for certain of the nitrile-type synthetic rubbers the solubility of these toxicants in all of the rubbers is between about 7% to about 15%/wt. With the nitrile rubbers toxicant solubility is adequate in the range of from about 15% to about 40%/wt. of combined acrylonitrile and rapidly decreases when the "bound" or combined acrylonitrile content of the copolymer exceeds the region of about 40%/wt.

The above and other similar elastomeric substances share common characteristics such as ability to accept carbon blacks, waxes, and fatty acids, they are sulfur-vulcanizable (although some respond also to other vulcanization systems), and they are strong and elastic when vulcanized. The choice among the many rubbers available will be based on cost and factors other than biocidal efficiency such as, for example, ability to resist environmental degradation, ease of application, essential physical properties required by the use, environment, etc. Preferred rubbers for compositions intended for antifouling applications in seawater are neoprene, natural rubber, butyl and the nitrile rubbers containing not more than about 35%/wt., of combined acrylonitrile. Most preferred in compositions for use in antifouling applications is neoprene.

In biocidal rubber compositions, particularly for use in larvacidal applications in fresh water, preferred rubbers are neoprene, natural rubber, butyl rubber, SBR, and EPDM rubbers. Again, most preferred for this type of application is neoprene.

PREPARATION OF COMPOSITIONS

The compositions of these compositions may be prepared in conventional rubber mixing and processing equipment with only slightly more careful precaution for ventilation, care against dermal contact, etc. than are already common in the rubber industry. In addition to the compounding ingredients referred to herein, the compositions should also include antioxidants, lubricants, accelerators and curatives, and other ingredients used for quality rubber vulcanizates in accordance with the rubber compounder's art. The elastomer is mixed in the usual fashion with the toxicant being added to the mixing batch at the time for addition of similar non-toxic rubber compounding ingredients. For example, the organotin compounds are supplied in the form of dry high melting powders which may be added at the same time as other dry and powdery compounding ingredients. Toxicants which are liquid or oily in consistency are added in the same fashion and at the same point in the mixing operation as are the ordinary lubricating and extender oils. Mixing may be carried out on two-roll rubber mills or in Banbury or other internal-type mixers. Once mixed, the composition may be sheeted off on a rubber mill or on a rubber calendar for use as sheets of antifouling rubber, or processed through an extruder as strips or tapes, or the output of the extruder fed to a pelletizer where it is cut, chopped or formed into pellets, or the stock formed into crude sheets and/or preforms for use in molding into the shapes and forms desired. The so-shaped rubber can then be vulcanized in an air or steam oven before use. The unvulcanized composition may be calendared or skim coated on fabric or other substrates to produce biocidal sheeting and fabrics for various protective uses.

Compositions for antifoulant use will usually be prepared as calendared sheets of uniform gauge or as formable putties which are then adhered by means of appropriate rubber-to-metal or other adhesives or, vulcanized directly to a variety of substrates such as metal plates, wood, plastics, fabrics, concrete, fiberglass and other structural materials, or prevulcanized pieces of these compositions may be adhered to any of the foregoing substrates by suitable cements and adhesives. One particular advantage of the antifouling compositions of this invention is that antifouling protection is not their only advantage on submerged marine structures. Rudders, propellors, shafting, housing, etc., on ship hulls are completely protected against cavitation. When the antifoulant layer is well adhered, metallic substrates are more completely protected against corrosion than when painted. Since the antifoulant rubber layer is thicker and heavier than a paint coating, it will have antiresonant characteristics. Depending on convenience, vulcanization of the antifoulant rubber may be effected after application by applying heat or by having incorporated therein so-called "room temperature curing systems" which cure slowly after application.

In use of larvacides, the biocidal rubber is usually fabricated so as to have a higher surface: volume ratio than obtains in antifoulant applications and this factor will require adjustment in either the formulation or in the cure, or in both, to obtain a toxicant release rate within the requirements of the particular larvacidal use contemplated. When so adjusted, the biocidal rubber is particularly effective for the target larvae but is not harmful to other animal and vegetable life in the concentrations suitable for killing the insect pest. Since strip or tape forms may be anchored in place, the biocidal rubber is useful in both stagnant and running waters. Since the larvacidal toxicant is released in highly mobile molecular form, no special distribution of the larvacidal rubber nor special expensive distribution equipment usually is required.

BIOCIDAL ACTIVITY

The biocidal elastomeric compositions of the present invention have a wide spectrum of uses. For example, the surface of sheets of these compositions thicker than about 0.05 inch adhered to a more or less imprevious substrate and immersed so one surface only contacts sea water remain free of barnacles, bryozoans, hydroids, algae, bugula, mussels, tunicates and other fouling genera for periods up to 50, 70 or 90 months. We have found that a minimum thickness for single-surface exposure is in the range of 0.05 inch and is necessary for long-lived antifouling action. When more than one surface is exposed to sea water, higher toxicant loadings, lower release rates, and thicker layers (i.e. at least about 0.125 inch) are required. We consider this thickness effect as the most convincing proof of the diffusional mechanism believed responsible for the biocidal performance of our biocidal rubbers. It should be noted that 0.05 inch is at least several times thicker than usually is obtainable with paints (0.008 to 0.02 inch) by practical or economical application procedures and while retaining adhesion of the paint film. Even better results are obtained at thicknesses of 0.06 to 0.15 inch. It appears that the relatively thick layers of practical antifouling rubber (containing from about 3 to about 12 phr. of organotin toxicant) constitutes an adequate reservoir of toxicant for very long life. Periodic chemical analysis of long immersed samples confirm a slow decline in toxicant concentration.

A surprising and useful result of the compositions used as antifoulant layers is the freedom of the immersed surfaces from algae, grasses and other slimy marine growths. Such accumulations do not occur or are not tenaciously retained until after the toxicant level of the rubber is exhausted and barnacles and other fouling genera begin to attach themselves to the surface.

The biocidal rubber compositions of this invention containing a larvicidally-effective organic toxicant are extremely effective larvacides which require only immersion of a sufficient quantity or dosage of the rubber in the infested water of farms, ponds, ditches, swamps, rivers, or other water bodies to maintain therein low but lethal proportions of toxicant ranging from about 0.1 p.p.b. to 1 or 2 p.p.m. For example, organotin compounds such as bis(tri-n-butyl tin) oxide at a level of from about 0.02 to 20%/wt. in a vulcanized rubber composition of this invention adjusted as indicated above and broadcast in pellet form on the infested water at a rate of from about 10 to 25 lbs./acre of water will maintain the treated water free of live mosquito larvae for many months. Gravid female mosquitos are attracted to water treated in this fashion with biocidal rubber containing organotin toxicants. At even lower levels of toxicant, a very high proportion of the mosquito eggs fail to hatch. Such larvacidal effect is maintained for many months or even years in stagnant water and has been observed to be maintained for 9 months or more in running water.

Likewise, a similar formulation containing "Bayluscide" (trademarked product of Farbenfabriken Bayer, A.G.; the 2-amino-ethanol salt of 2′,5-dichloro-4′-nitrosalicylanilide) and employed in a similar fashion, will effect a 100% kill in 24 hours or less of shistosome cercariae and their snail hosts. Shistosome cerariae, per se, are killed in the matter of minutes after contacting water containing 1 p.p.b. or less of Bayluscide.

Surprisingly, Bayluscide/rubber compositions of this invention are excellent antifouling materials, although antifouling behavior of this type of toxicant has not been reported previously.

Since the toxicant concentrations in these rubber compositions are firmly bound and the composition in itself is relatively immobile, shipping, storage, and handling are a great deal safer than the pure toxicant alone and the health hazard from accidental ingestion by breathing and/or by skin absorption greatly reduced. Even accidental spillage is unlikely to lead to severe poisoning since release of toxicant in this case is severely limited by low volatility and/or low solubility of the toxicant in air or water.

These compositions may be employed in various forms for protective biocidal action. For example, water bags or canteens may be made of fabric rubberized with one of these biocidal rubbers, or the canteens can be molded directly of the rubber. In any case, these compositions will be toxic to flukes and many other organisms in the water harmful to humans. The compositions themselves are apparently not harmful to humans and do not materially affect the taste of water. Obviously, any composition touching food, water or other material for human consumption must in all other respect be based on toxicants non-toxic to humans.

Protective clothing made of fabrics rubberized with one of these compositions or impregnated with a latex of biocidal rubber can be made which will protect humans and animals against many insect pests and many forms of bacteria and fungi. In screening new organic toxicants for use in biocidal rubber, failure of bacteria and fungi to multiply on the surface of a vulcanized rubber composition containing it has been found a very useful and inexpensive research tool indicating the biocidal effectiveness of the composition.

Some of the salient experimental facts we have confirmed using the biocidal rubbers of this invention are:

(1) Rubber compositions containing organotin additives effect a 100% kill (within 24 hours) of mosquito and midge larvae at less than 1 p.p.m. concentration in the infested water of the substance or substances released by the rubber into the water, and their eggs fail to hatch at even lower concentrations;

(2) The compositions of (1) effect a 100% kill of snail hosts of shistosome cercariae at concentrations of less than 200 parts/wt. per billion of the dissolving substance or substances in the infested water, within 24 hours of the immersion of the composition;

(3) The item (1) compositions effect a 100% kill of shistosome cercariae themselves at concentrations of less than 1 p.p.b. of the dissolving substance or substances in the infested water within three minutes of the exposure of the cercariae, thereby indicating that infested waters treated with very low concentrations in the form of long-lasting biocidal rubbers can free the water of cercariae without necessarily destroying the snails;

(4) Biocidal rubber compositions containing "Bayluscide" additives effect a 100% kill of the host snail of the shistosome cercariae at concentrations of the dissolving toxic in the infested water of less than 1 p.p.m. within 24 hours of the immersion of the composition; this effect being continued in flowing water for more than nine months without loss of toxic strength;

(5) The item (4) compositions effect a 100% kill of shistosome cercariae within minutes at concentrations of less than 10 p.p.b. of the dissolving substance or substances in the infested water;

(6) Snail hosts of the shistosome cercariae are strongly affected for periods as long as 600 hours after contact with supposedly non-lethal concentrations well below those given above putting in question of the long term effects of even such microscopic concentrations and raising questions about accepted dosage levels of these well-known toxicants.

(7) Gravid female mosquitos are attracted by water containing the above-listed low concentrations of organotin compounds released from a biocidal rubber;

(8) Fabric coated with a biocidal rubber of this invention kill adult mosquitos, body lice, termites, cockroaches and horseflies coming into contact therewith;

(9) Surfaces of the biocidal rubbers of this invention kill and prevent growth of many pathogenic bacteria and fungi, including staphylococci and streptococci;

(10) Rabbits will not chew a biocidal rubber containing TBTO or TBTS;

(11) Rats will not gnaw such biocidal rubber compositions;

(12) Woodpeckers will not penetrate such compositions;

(13) Cats, dogs, birds, bats and raccoons are repelled by coming near such rubber compositions;

(14) Cold weather and cold water inhibits marine fouling and kills larvae, but low temperatures have no effect on the biocidal efficiency of these compositions whenever warm weather returns or is encountered, as by a moving ship.

The invention will now be described with reference to several specific examples which are intended to be illustrative only and not as limiting the invention.

EXAMPLE I

In this example, bis (tri-n-butyl tin) oxide ("TBTO") and "Neoprene WRT" (polychloroprene) are utilized in preparing a biocidal rubber composition of this invention. The compounding recipe is as follows:

| Material: | Parts/wt. |
|---|---|
| Neoprene WRT | 100.0 |
| FEF carbon black | 14.5 |
| PBNA [1] | 2.0 |
| ZnO | 5.0 |
| Lauric acid | 3.0 |
| MgO | 4.0 |
| Ethylene thiourea ("Na22") | 0.75 |
| Benzothiozyldisulfide (MBTS) | 1.0 |

[1] Phenyl beta-naphthylamine.

The above materials are mixed on a cold rubber mill by first milling the rubber until a sheet forms and then adding the other materials gradually while continuing the milling. To the above standard formulation are added varying amounts of TBTO added as a oily liquid. The latter disappears rapidly and is absorbed by the rubber mix during milling. All compositions have good milling qualities. The resulting compositions are vulcanized for 30 or 45 minutes at 300° F. in a sheet mold. The resulting vulcanized sheets are 0.03, 0.062 or 0.125 inch in thickness and are adhered to metal panels ("Hydro-Lock" Cement; B. F. Goodrich Company, Akron, Ohio) which are immersed in the sea off Miami Beach, Fla., and off Duxbury and Woods Hole, Mass. Each panel is removed from the water once each month for inspection with an actual count of the barnacles and bryozoans attached to each sheet, counted and noted. The results are as follows:

| Code | TBTO, phr. (percent/wt.) | Thickness, in. | Status—40th mo., No. barnacles | Bryozoan coverage, percent | Expected foul-free life, mos. |
|---|---|---|---|---|---|
| 351B | 12.0 (8.4) | 0.062 | 0 | 0 | [1] 70 |
| 351C | 6.0 (4.38) | 0.062 | 0 | 0 | 57 |
| 351D | 4.0 (2.9) | 0.062 | 0 | 1 | 58 |
| 351E | 2.0 (1.5) | 0.062 | 0 | 1 | |
| 351F | 1.0 (0.75) | 0.062 | 0 | 0 | |
| 351G | 0.5 (0.37) | 0.062 | 0 | 1 | |
| 351H | 0.25 (0.18) | 0.062 | [2] CF | 35 | |
| 351I | 0.125 | 0.062 | [2] CF | [2] CF | |
| 351J | 0.06 | 0.062 | [2] CF | [2] CF | |
| 351B | 12.0 | 0.125 | 0 | 0 | |
| 351C | 4.0 | 0.125 | 0 | 0 | |
| 351F | 1.0 | 0.125 | 0 | 10 | |
| 351H | 0.25 | 0.125 | 40 | 17 | |
| 351J | 0.06 | 0.125 | [2] CF | [2] CF | |
| 351C | 6.0 | 0.032 | 0 | 0 | |
| 351E | 2.0 | 0.032 | 0 | 0 | |
| 351G | 0.5 | 0.032 | 2 | 5 | |

[1] According to residual tin analysis.
[2] Completely fouled.

Experiments similar to those above are also carried out employing sheets 1/32, 1/16 and 1/8-inch in thickness at each of 0.25, 1.0, 4.0 and 12 phr. loadings. This is to illustrate the interlocking nature of the toxicant loading/thickness relationship. The data are as follows:

| Code | Thickness, in. | TBTO, phr. | Months to first appearance |||
|---|---|---|---|---|---|
| | | | Algae | Barnacles | CF [1] |
| 351B | 1/32 | 12 | 17 | 24 | 33 |
| 351B | 1/16 | 12 | 29 | | |
| 351B | 1/8 | 12 | | | |
| 351D | 1/32 | 4.0 | 10 | 17 | 18 |
| 351D | 1/16 | 4.0 | 18 | 30 | |
| 351D | 1/8 | 4.0 | | | |
| 351F | 1/32 | 1.0 | 7 | 13 | 19 |
| 351F | 1/16 | 1.0 | 6 | 12 | 17 |
| 351F | 1/8 | 1.0 | 10 | 18 | 23 |
| 351H | 1/32 | 0.25 | 2 | 3 | 8 |
| 351H | 1/16 | 0.25 | 2 | 4 | 15 |
| 351H | 1/8 | 0.25 | 6 | 2 | 20 |

[1] "CF" means completely fouled.

Those not completely fouled ("CF") continue unfouled at 42 months. From these and other data, it appears that long extended antifouling action with organotin toxicants requires a thickness of at least about 0.05 inch and an organotin loading of at least about 2 phr.

Results similar to those obtained on immersion off Miami are achieved off Bimini, B.W.I.; Kaneoha Bay, Hawaii; Seattle, Wash.; and Long Beach, Calif.

EXAMPLE II

In another warm water test off Miami, similar 1/8-inch panels containing 6 to 12 phr. of TBTO show very extended no-fouling life. In one such panel bis(tributyltin) sulfide (TBTS) is substituted for TBTO. Core type samples removed from such panels are analyzed for residual tin content as a basis for a "Predicted Foul-free Life." The data are:

| Toxicant | Phr. | Months foul-free at last report | Months predicted foul-free life |
|---|---|---|---|
| TBTO | 7 | 35 | 50 |
| TBTO | 6.5 | 39 | 55 |
| TBTO | 7 | 39 | 55 |
| TBTS | 7 | 40 | 60 |
| TBTO | 12 | 40 | 70 |

These results exceed the best performance of the best antifouling paints by a factor of 4 to 6 or more and at organotin loadings 1/5 to 1/3 those of the paints.

As indicated above, antifouling life predictions are based on residual tin analyses. Below are shown a typical series of analyses on one neoprene panel which contained about 12 phr. of TBTO (corresponds to 3.52%/wt. of tin, as tin); the data are:

| Months immersed: | Percent/wt. residual tin |
|---|---|
| 0 | 3.52 |
| 1 | 2.46 |
| 2 | 2.11 |
| 3 | 1.77 |
| 30 | 0.81 |

Barnacles begin to attach when the residual tin concentration falls to about 0.04 to 0.05%/wt. Algae growth commences when the residual tin content has fallen to about 0.1%/wt.

Similar formulations based on neoprene but employing HAF carbon black are prepared with various levels of either TBTO or TBTS. The recipe is as follows:

| Material: | Parts/wt. |
|---|---|
| Neoprene WRT | 100 |
| HAF black | 29.6 |
| PBNA | 2.0 |
| ZnO | 5.0 |
| Stearic acid | 0.5 |
| Na22 [1] | 0.5 |
| MgO | 2.0 |

[1] Ethylene thiourea.

The above formulations are cured for 15 minutes at 307° F. in the form of sheets 0.075 inch thick. Panels are prepared as indicated and immersed off Miami, Fla. The data are as follows:

| Panel No. | Toxicant | Phr. | Months to (average) | | | |
|---|---|---|---|---|---|---|
| | | | 1% algae | 1 barnacle | 50 barnacles | CF |
| B151 | 0 (Control) | | 1 | 1 | 1 | |
| B152 | TBTO | 1.0 | 7 | 18 | 19 | 21 |
| B153 | TBTO | 3.0 | 24 | 26 | 27 | 29 |
| B154 | TBTO | 5.0 | 26 | 28 | | |
| B155 | TBTO | 8.0 | 30 | 31 | | |
| B156 | TBTS | 2.0 | 20 | 26 | 28 | |
| B157 | TBTS | 4.0 | 22 | 27 | | |
| B158 | TBTS | 6.0 | 21 | | | |
| B159 | TBTS | 10.0 | | | | |

In the above data and elsewhere herein, where no value is given immersion testing continues on foul-free panels. Based on the above data, it appears that the 29.6 phr. of carbon black was somewhat too high for the panels containing only 1 to 3% toxicant. Panels containing 4 phr. or more of toxicant are excellent antifouling materials. TBTS is shown to be as effective or more effective than TBTO.

Because the compositions of Example II did not exhibit as long a foul-free life as those of Example I of comparable TBTO level, it is decided to evaluate the effect of the type of carbon black on the antifouling efficiency of neoprene formulations. Separate compositions are prepared from each of a number of commercially-available carbon blacks according to the procedure and recipe of Example I. Test panels are then prepared and immersed at Miami, Fla. To reduce the test time, only 0.72%/wt. (1 phr.) of TBTO is employed. In the data below, the carbon black is identified by commercial-type designation, ultimate particle size and typical oil absorptivity values.

| Carbon black type | Particle size | Oil absorptivity, gals./100 lbs. | Five-month fouling performance |
|---|---|---|---|
| "SAF" | 11–19 | | None. |
| "ISAF" | 20–25 | ca. 15.0 | Do. |
| "EPC" | 26–30 | ca. 11.0 | Do. |
| "FF" | 31–39 | ca. 9.5 | Do. |
| "FEF" | 40–48 | | Fouling month IV. |
| "HMF" | 49–60 | ca. 7.0 | Fouling month III. |
| "SRF" | 61–100 | ca. 6.0 | Fouling month II. |
| "FT" | 101–200 | ca. 5.0 | Do. |
| "MT" | 201–500 | ca. 4.0 | Do. |

At the above TBTO level, neoprene/TBTO formulations may be expected to remain completely free of algae for at least six or seven months and free of barnacles for at least 12 to 13 months. The carbon blacks of higher structure as shown by oil absorptivities greater than that of "FF" above, show the desired slow toxicant release rates.

Carrying this study still further, similar formulations are prepared, all based on ISAF-type carbon black, but with differing proportions of ISAF. The antifouling behavior of these biocidal rubbers 0.18%/wt. of TBTO (0.25 phr.) is as follows:

| Phr.-ISAF carbon black: | Month to 1st barnacle |
|---|---|
| 10 | — |
| 10 | — |
| 14.5 | — |
| 14.5 | — |
| 20.0 | 2 |
| 20.0 | 3 |
| 30.0 | 3 |

These data indicate that the shorter antifouling noted in Example II is due to too high a level of carbon black at this low TBTO level. Apparently, TBTO diffusion rates at the higher black loadings are too low at this low level of TBTO to maintain an antifouling surface.

In case that the cure conditions in tht above experiments were not correct still another series of formulations are prepared, all employing 14.5 phr. of ISAF carbon black, 0.25 phr. of TBTO and all cured at 300° F. but for differing periods of time. The data below demonstrate the antifouling behavior of test panels immersed for six months at Miami, Fla.:

| Cure time, minutes | Month to 1st barnacle | Six month observation— no barnacles |
|---|---|---|
| 20 | | None. |
| 20 | | Do. |
| 20 | | Do. |
| 30 | | Do. |
| 30 | | Do. |
| 30 | | Do. |
| 45 | | Do. |
| 45 | 6 | 2 barnacles. |
| 60 | 3 | 1 barnacle. |
| 60 | 2 | 3 barnacles. |
| 60 | 4 | 1 barnacle. |
| 90 | 2 | 20 barnacles. |
| 120 | 2 | 5 barnacles. |

The above data indicate that a cure of 20 to 30 minutes at 300° F. produces markedly better antifouling behavior than even moderately overcured panels which are cured 45–60 minutes.

EXAMPLE III

In this series of tests, panels are prepared each having an adhesively-secured layer 1/16 inch thick of a neoprene/TBTO formulation similar to that of the recipe given in Example I (6.5 phr. TBTO) except for the use of varying proportions of a petroleum wax. The rubber sheets are cured 45 minutes at 300° F. The data obtained on immersion off Miami are as follows:

| Code | Wax[1] loading | Months to appearance of: | | Foul-free life[2], mos. |
|---|---|---|---|---|
| | | Algae | Barnacles | |
| 105B | None | 32 | 39 | 39 |
| 311A | 2 | 38 | | 45 |
| 373B | 5 | 38 | | 55 |
| 373C | 2 | 38 | | 58 |
| 373D | 2 | 38 | | 58 |

[1] Antisun wax, specific gravity=0.92.
[2] By residual tin analysis.

The use of 2 to 5 phr. of wax is seen to exhibit a rather strong effect on the foul-free life. A foul-free life of nearly five years in subtropical coastal waters is at least three times or more better than that of the very best antifouling paints.

EXAMPLE IV

In a similar fashion, panels are prepared based on natural rubber and employing TBTO or TBTS. The general recipe and cure cycle employed is:

| Material: | Phr. |
|---|---|
| Natural rubber | 100 |
| HAF carbon black | 40 |
| PBNA | 1 |
| ZnO | 5 |
| Stearic acid | 3 |
| MBTS | 0.6 |
| Sulfur | 2.5 |

The material is cured for 15 minutes at 307° F. in the form of sheets 6" x 6" x 0.075" which are adhered with adhesive to polyvinyl chloride substrates to insure contact of only one surface with sea water. Immersion is off Miami, Fla., for 35 months to date of last report. The data obtained are:

| Code | Toxicant | | Month to (average 2 to 6 panels) | | | |
|---|---|---|---|---|---|---|
| | Type | Phr. | 1% algae | 1 barnacle | 50 barnacles | CF |
| B1 | 0 | 0 | 1 | 1 | 1 | 1 |
| B2 | TBTO | 1 | 11 | 13 | 15 | 18 |
| B3 | TBTO | 3 | 18 | 16 | 20 | 21 |
| B4 | TBTO | 5 | 23 | 22 | 24 | 23 |
| B5 | TBTO | 8 | 26 | 26 | | |
| B6 | TBTS | 2 | 8 | 11 | 19 | 19 |
| B7 | TBTS | 4 | 20 | 18 | 21 | 23 |
| B8 | TBTS | 6 | 20 | 22 | 23 | 23 |
| B9 | TBTS | 8 | 21 | 29 | | |

The above data indicate that natural rubber compounds lose toxicant relatively faster than does neoprene and the use of about 50 phr. of carbon black and/or 2 to 5 phr. of wax would slow such loss and produce longer-lived antifouling coatings. Of the panels remaining on test after 35 months, those containing 10 phr. of TBTS appear to be very good antifouling materials. Nevertheless, the panels containing 5 to 6 phr. or more of either toxicant are good for approximately 2 years or more under extremely severe semi-tropical coastal fouling conditions.

EXAMPLE V

In this example, a series of panels each containing 10 phr. of TBTS are prepared each from a different elastomer, including several nitrile rubbers known as "Hycar 1043" (butadiene/acrylonitrile copolymer containing about 34%/wt. combined acrylonitrile) and Hycar 1001 (similar but containing about 38 to 40%/wt. combined acrylonitrile) and Hycar 1014 (similar but containing about 18%/wt. combined acrylonitrile; all products of The B. F. Goodrich Chemical Company, Cleveland, Ohio); SBR rubbers 1001, 1013 and 1015; "Ameripol CB," a cis-1, 4-polybutadiene rubber made by Goodrich-Gulf Chemicals, Inc., Cleveland, Ohio; butyl rubber; and EPDM rubber ("Nordel 1070," Du Pont). The recipes, other than those for neoprene and natural rubber which are given in the Examples above, are as follows:

|  | CB | Hycar | SBR | Butyl | EPDM[1] |
|---|---|---|---|---|---|
| Rubber | 100 | 100 | 100 | 100 | 100 |
| ISAF | 30 | | | | 85 |
| SRF | | 40 | | | |
| HAF | | | 40 | | |
| EPC | | | | 50 | |
| ZnO | 3.6 | 3.6 | 5 | 5 | 5 |
| Stearic acid | | | 1.5 | 3.0 | 0.5 |
| Lauric acid | 3.0 | 3.0 | | | |
| MBTS | | | 0.8 | 0.5 | 0.5 |
| TMTD | | 0.4 | 0.15 | 1.0 | 1.5 |
| "Santocure"[2] | 1.70 | | | | |
| Sulfur | 2.50 | 1.5 | 1.75 | | |
| Cure | ([3]) | ([3]) | ([4]) | | ([5]) |

[1] Contains also 50 phr. Flexon 76, processing oil.
[2] "Santocure", N-cyclohexyl-2-benzothiazylsulfenamide.
[3] 15 minutes at 307° F.
[4] 30 minutes at 307° F.
[5] 60 minutes at 307° F.

The materials are mixed on a rubber mill and molded into sheets 6" x 6" x 0.075" thick which are adhered by a suitable adhesive to either a stainless steel or polyvinyl chloride backing. The panels so prepared are immersed off Miami, Fla., and the data taken for 35 months. The data are summarized as follows in order of antifouling efficiency and life:

| | | Months to: | |
|---|---|---|---|
| Rank | Elastomer base | 1 barnacle | CF |
| 1 | Hycar 1043 | 35+ | 35+ |
| 2 | Hycar 1014 | 30 | 35+ |
| 3 | Natural rubber | 29 | 35+ |
| 4 | SBR 1013 | 29 | 35+ |
| 5 | CB | 25 | 35+ |
| 6 | SBR 1015 | 24 | 35+ |
| 7 | Hycar 1001 | 23 | 35+ |
| 8 | Butyl | 22 | 35+ |
| 9 | SBR 1001 | 22 | 35+ |
| 10 | EPDM | 21 | 25 |

All of these formulations outperform the best antifouling paints by a considerable margin.

EXAMPLE VI

In this example, several organo-tin compounds are evaluated in place of TBTO and TBTS. These are tributyl tin acetate ("TBTA"), triphenyl tin chloride ("TPTC"), and tributyl tin fluoride ("TBTF"). In addition, "Bayluscide" (2-ethanolamine salt of 2',5-dichloro-4-nitrosalicylanilide) and phenyl mercury oleate ("PMO") are evaluated as antifoulants. All are employed in a neoprene formulation similar to that of Example I. These are prepared as panels having a rubber layer .03 to .062 inch thick and they are immersed off Miami, Fla. The data are summarized as follows:

| Toxicant | | Thickness, | |
|---|---|---|---|
| Type | Phr. | inches | Barnacle fouling |
| TBTF | 8.0 | 0.0625 | None at 35 mos. |
| TBTA | 8.0 | 0.075 | None at 21 mos. |
| TPTC | 5.0 | 0.032 | Fouling commences 20th mos. |
| Bayluscide | 4.0 | 0.062 | No fouling at 35 mos. |
| PMO | 10.0 | 0.025 | Fouled at 22 mos. |

EXAMPLE VII

In a similar fashion, panels based on "Polysar 301" butyl rubber (Polymer Corp., Ltd., Sarnia, Ontario) are prepared. The basic recipe employed is:

Material: Butyl-phr.
 Rubber _____ 100
 ZnO _____ 5
 Stearic acid _____ 3
 MBTS _____ 0.5
 TMTD _____ 1.0
 Sulfur _____ 2.0
 EPC carbon black _____ 50
 Cure, 25' at 307° F.

Panels immersed off Miami yield the following data:

| | Toxicant | | Months immersion (foul-free) | |
|---|---|---|---|---|
| Code | Type | Phr | To date | Predicted life [1] |
| 390B | TBTO | 6.5 | 34 | 55 |
| 431A | TBTO | 8.5 | 35+ | 65 |
| | TBTO | 12.5 | 35+ | 76 |
| | TBTO | 20 | 35+ | 96 |

[1] By residual tin analysis.

All of the above panels showed excellent retention of physical properties as well as foul-free performance of three years or more and a predicted foul-free life exceeding 4 or 5 years. Butyl rubber at these loadings forms excellent, long-life antifouling materials because physical properties (i.e. integrity of rubber) decline quite slowly on immersion.

EXAMPLE VIII

In this example, TBTO and Bayluscide in neoprene are evaluated as a larvacide against snails (*Helisoma trivolvis*). A composition containing TBTO at 8 phr. in neoprene is prepared and cured as in Example I. Similar composition containing Bayluscide at 1, 4 and 8 phr. are also prepared in the same fashion. Strips of the resulting vulcanized sheets are each suspended in running water for 8 weeks before being employed in the test, this being assumed to represent a test of larvacidal longevity. A 300 sq. cm. portion of the washed rubber is then suspended in 600 ml. of dechlorinated water for 24 to 27 hours and then removed before adding the snails. The concentration of toxicant in the stock solution is not shown but equilibrium solubility concentrations probably are not reached. In all cases, 100% kills of the snails are achieved in 24 hours or less.

EXAMPLE IX

A small quantity of the solution obtained from the 8 phr. TBTO in neoprene of Example VIII is transferred by pipette into watch glasses containing shistosome cercariae in various quantities of distilled water. Based on the estimated TBTO diffusion rate on long term immersion in sea water, the initial concentration in each watch glass is of the order of 0.1 p.p.m. at most and of the order of 1 part per billion at the low end. Kills are 100% over the entire range and death occurs almost immediately or within a very few minutes after adding the TBTO containing solution.

EXAMPLE X

The procedure of Example IX is repated employing a neoprene composition containing 8 phr. of Bayuscide. The rubber is steeped 48 hours in dechlorinated water. The toxicant concentration of this stock solution is unknown but is estimated at less than 1 p.p.m. Such stock solution is employed full strength and diluted by factor of 10 and 100. The results are as follows:

| Solution | Observations after— | | |
|---|---|---|---|
|  | 5 min. | 30 min. | 60 min. |
| Full strength | All dead | Same | Same. |
| Diluted 10 times | Active | Little activity | Inactive. |
| Diluted 100 times | do | Active | Active. |

From the foregoing, it appears that the biocidal neoprene formulation will in 48 hours or less impart to water in contact therewith the ability to kill shistosome cercariae "flukes" in a matter of minutes. These results appear to have been obtained at 0.1 to 1 p.p.m. or less.

EXAMPLE XI

Different biocidal rubbers, all based on neoprene but each containing various loadings of various organotin toxicants, of an organo-mercury compound and of Bayluscide are evaluated against snails. The procedure of Example VIII is followed (except no running water treatment). The stock solutions are diluted by 10, 100 and 1,000. Snails are placed in a cardboard box lined with polyvinyl chloride film; the snails conditioned 24 hours with non-toxic water; and then the toxic water is introduced. Except in the undiluted tests, where only two snails are employed, five or ten live *Melisoma trivolvis* snails are used in each experiment.

The data are as follows:

| Code | Toxicant | Phr. | Conc. 1, $L+D^1$ | 0.1, $L+D$ | 0.01, $L+D$ | .001, $L\pm D$ |
|---|---|---|---|---|---|---|
| Control | 0 | 0 | 2+0 | 2+0 | 2+0 | 2+0 |
| 443E | TBTO | 8 | 0+2 | 0+5 | 3+2 | 4+1 |
| 351B | TBTO | 12 | 0+2 | 0+5 | 2+3 | 5+0 |
| 345B | $PMO^2$ | 10 | 0+2 | 0+5 | 5+0 | 4+1 |
| 373B | TBTO | 6.5 | 0+2 | 0+5 | 5+0 | 5+0 |
| 378A | TBTO | 5.0 | 0+2 | 0+5 | 0+5 | 4+1 |
| 419B | $TBTR^3$ | 8.0 | 0+2 | 0+5 | 5+0 | 5+0 |
| 895A | Bayluscide | 1.0 | 0+2 | 0+5 | 5+0 | 5+0 |
| 895B | do | 6.0 | 0+2 | 0+10 | 10+0 | 10+0 |
| 633A | {Bayluscide / TBTO} | 8.0 / 3.0 | 0+2 | 0+5 | 5+0 | 5+0 |
| 350A | $TPTC^4$ | 10 | 0+2 | 0+5 | 5+0 | 5+0 |

[1] L=living; D=dead.
[2] Phenyl mercury oleate.
[3] Tributyl tin resinate, made by M & T Chem. Co.
[4] Tripropyl tin chloride.

It appears that very low dilutions of 0.1 to 1 p.p.m. are sufficient to kill snails.

These and other similar data are confirmed on field testing. Samples of some of the same rubbers above (443A, 633A, 895A and 895B) are placed in running water for 9 months and then the above procedure is repeated. The data on 24 hour observation are

| Code | Toxicant | Phr. | Concentration or dilution | |
|---|---|---|---|---|
|  |  |  | 0.1, L+D | 0.01, L+D |
| 895A | Bayluscide | 1.0 | 0+10 | 10+0 |
| 895B | do | 6.0 | 0+10 | 10+0 |
| 633A | do | 8.0 | 0+10 | 10+0 |
| 443A | TBTO | 8.0 | 0+10 | 10+0 |

The above data indicates the biocidal neoprene formulations would be active and effective against snails in infested water for 9 months or more and at very low concentrations.

EXAMPLE XII

In this example, a series of biocidal natural rubber compositions are prepared using the general recipe and cure cycle of Example IV except for variation in the TBTO content and by substituting various fatty acids for all or a portion of the stearic acid. The resulting vulcanized rubber sheets are employed in the procedure of Example VIII. Seven day stock toxicant solutions are prepared which are diluted by 10, 100, and 1000 times in some of the tests. The $LC_{100}$ (max.) (concentration for 100% kill in 24 hours) is calculated for each of the biocidal rubbers and is shown below.

| Code | Fatty acid | | TBTO, phr. | $LC_{100}$ (max.)[1] |
|---|---|---|---|---|
|  | Type | Phr. |  |  |
| 300E | Oleic | 2 | 1.0 | 2 |
| 300H | Palmitic | 1 | 1.0 | 15.1 |
| 300F | Oleic | 6 | 4.0 | 0.95 |
| 300D | Lauric | 4 | 6.0 | 2.0 |
| 300J | Palmitic | 3 | 6.0 | 0.25 |
| 300A | Lauric | 4 | 8.0 | 1.5 |
| 300B | do | 6 | 8.0 | 1.3 |
| 300C | do | 8 | 12.0 | 0.35 |
| 300G | Oleic | 8 | 12.0 | 0.09 |
| 300K | Palmitic | 8 | 12.0 | 0.09 |

[1] 24 hour exposure.

Several of the stock solutions employed in the foregoing examples are allowed to stand 21 days before the foregoing snail tests are repeated. This is to demonstrate the persistence or stability of the dissolved toxicant. The data are:

| Code | Toxicant | Phr. | Dilution factor | | | | |
|---|---|---|---|---|---|---|---|
|  |  |  | 0.1 | 0.05 | 0.01 | 0.005 | 0.001 |
| 300C | TBTO | 12 | 0+20 | 0+20 | 17+3 | 16+4 | ---- |
| 300K | TBTO | 12 | ---- | ---- | 0+20 | 9+11 | 19+1 |
| 300J | TBTO | 6 | ---- | ---- | 9+11 | 19+1 | 19+1 |
| 300G | TBTO | 12 | ---- | ---- | 8+12 | 15+5 | 17+3 |
| 633A | Bayluscide | 8 | 0+20 | 0+20 | 18+2 | 17+3 | 17+3 |

NOTE.—"19+1" taken as normal mortality.

It is clear that both Bayluscide and a TBTO-X (material believed released from a fatty acid containing vulcanizate) retain considerable potency. Of the two, the TBTO-X material appears most resistant to hydrolysis or other change on standing in water. Apparently, palmitic acid is the most effective in a biocidal sense.

EXAMPLE XIII

In this example, the time for water in contact with the biocidal neoprene/TBTO composition of the preceding examples to reach lethal concentrations is evaluated. In this test, 20 sq. cm. of the rubber are added to 600 ml. of dechlorinated water along with 10 snails (*Helisoma trivolvis*). The data are as follows:

| Observed effect | Hours to reach | | | | | | |
|---|---|---|---|---|---|---|---|
|  | 633A | 300C | 300G | 300J | 300K | 351B | 443A |
| (1) Partial retraction | 18 | 5 | 5 | 5 | 7 | 9 | 5 |
| (2) Full retraction | 24 | 7 | 7 | 9 | 9 | 9 | 7 |
| (3) Moribund | 26 | 8 | 9 | 9 | 9 | 10 | 9 |
| (4) Dead | 27 | 10 | 10 | 10 | 10 | 12 | 11 |

The biocidal rubbers appear to exert their lethal effects in a very short period of hours. In the above and other simliar series of tests we have sometimes noted an abnormally high mortality among snails which were counted as having survived the 24-hour observation period indicating that 24 hours is too short to represent a true test of lethal dosages. Abnormally high snail mortalities have been observed for as many as 50 days after exposure.

In a similar series of tests where varying total surface area of biocidal rubber is varied, it is noted that the rapidity of kill depends on the rubber surface area exposed. These and similar tests wherein a single piece of sheet-like rubber is employed, indicate that smaller quantities require longer exposure time. Rubber in a physical form having a higher surface/volume ratio are more efficient and kill snails even more rapidly than is indicated above.

EXAMPLE XIV

In this example, biocidal rubbers are evaluated against mosquito larvae (*Culex pipiens*). The biocidal rubber employed is the formulation of Example I containing 6.5 phr. of TBTO in neoprene. Various quantities of the rubber are placed in water with a known number of live mosquito larvae. Mortality counts are taken over various periods of time, depending on concentration. The data are summarized below:

A cheese cloth prevents direct contact of the larvae with rubber specimen. The mortality count is taken over a 4-day period, all larvae seined out, and a new batch of 50 unexposed larvae added. Repeated cycles of this type are carried out for a total of about 42 days. The data on the first cycle are representative:

| Code | Base elastomer | Toxicant Type | Phr. | Accumulative mortality (percent) after— | | | | |
|---|---|---|---|---|---|---|---|---|
| | | | | 0 day | 1 day | 2 days | 3 days | 4 days |
| 345B | Neoprene | PMO | 10 | 0 | 0 | 0 | 90 | 100 |
| 350A | do | TPTC | 8 | 0 | 0 | 0 | 20 | 100 |
| 351B | do | TBTO | 12 | 0 | 0 | 0 | 20 | 100 |
| 378A | Hycar | TBTO | 6.5 | 0 | 0 | 0 | 50 | 100 |
| 339A | Neoprene | TBTO | 7.0 | 0 | 0 | 0 | 0 | 100 |
| 390B | Butyl | TBTO | 6.5 | 0 | 0 | 0 | 20 | 100 |
| 419A | Neoprene | TBTAd [1] | 8.0 | 0 | 0 | 0 | 0 | 100 |
| 443A | do | TBTO | 8.0 | 0 | 0 | 0 | 20 | 100 |
| 895B | do | Bayluscide | 6.0 | 0 | 0 | 0 | 0 | 100 |
| 389B | do | TBTO | 7.0 | 0 | 0 | 0 | 20 | 100 |

[1] Tributyltin adipate.

Dosage*:

| | $LD_{100}$ (time) |
|---|---|
| 0.5 p.p.m. | 24 hours. |
| 0.1 p.p.m. | 8 days. |
| 0.03 p.p.m. | 12 days. |
| 1.0 p.p.m. (pure TBTO) | 24 hours. |

*Calculated using diffusion rates determined by residual tin analysis of long immersed rubber.

Similar solutions are employed as larvacides against midge and black fly larvae. Even at 0.03 p.p.m. midge larvae succumb (100%) within 24 hours.

A 200-foot section of a rubber tape prepared from the above TBTO/neoprene composition containing 6.5 phr. (2.32%/wt. of tin) of TBTO is secured or anchored below the surface of the water in a suburban drainage ditch. Except for periods of high septic input, definite control of mosquito larvae is observed over a span of two years. A sample of the tape removed after 8 months showed a decline in residual tin (as tin) content from 2.32% to 2.28%/wt.

EXAMPLE XV

In this example, various amounts of a number of biocidal rubbers of the previous examples are evaluated against the larvae of various mosquito specie. In this series, the given weight of rubber is placed in 250 grams of dechlorinated water. The data are as follows:

| Species | Base rubber | Toxicant Compound | Phr. | Weight rubber, g. | Mortality (24 hrs.), percent |
|---|---|---|---|---|---|
| Culex quinquefasciatus | Neoprene | Compound | 8 | 0.37 | 8 |
| Do | do | TBTO | 8 | 1.45 | 36 |
| Do | Paracril | TBTO | 5 | 0.44 | 8 |
| Do | do | TBTO | 5 | 1.83 | 44 |
| Aedes taeniorhynchus | Neoprene | TBTO | 8 | 0.38 | 8 |
| Do | do | TBTO | 8 | 1.3 | 22 |
| Do | Paracril | TBTO | 5 | 0.46 | 6 |
| Do | do | TBTO | 5 | 1.79 | 16 |

When the above quantities of the above rubbers are steeped for 30 days in dechlorinated water 100% kills/24 hours are obtained in every case. When the dead larvae are removed and fresh larvae added 100% kills/24 hours are obtained for a total of 45 days. Unlike some of the toxicants which are known to rapidly lose potency, TBTO or TBTO-X released from vulcanized rubber demonstrates great persistency.

EXAMPLE XVI

The long term, low concentration effect of a number of biocidal rubbers are better demonstrated in a series wherein 18 sq. cm. of the thin sheet-like rubber are suspended by a nylon cord in the center of a 5 gallon glass jar containing about 10 liters of dechlorinated water and then introducing 50 live mosquito (Culex pipiens) larvae.

All of the above biocidal rubbers are made by the recipes of the foregoing examples.

On the second cycle all but the Bayluscide rubber seemed more efficient (due to toxicant build-up) since partial kills are observed on the 1st and second days with 50 to 90% kills on the 3rd day and 100% on the fourth day in all cases. All organotin containing rubbers continued this type of performance without increase or decrease for the 42-day period indicating that the equilibrium concentration of toxicant was reached at the end of the first cycle. Taking the code 351B material as illustrative, the toxicant concentration at the end of the first 4 days is estimated to be 0.288 p.p.m. It is clear that the above tin-containing biocidal rubbers are extremely long-lived larvacides highly effective over long periods of exposure such as would occur in treating natural water courses.

EXAMPLE XVII

In this example many different biocidal rubbers containing various organic toxicants are evaluated as to their ability to prevent hatching of mosquio eggs. The procedure of the preceding example is followed except that eggs are substituted for larvae. The rubbers are prepared as in the preceding examples employing the recipes and cure cycles given and the toxicant loadings listed below:

| Code | Base elastomer | Toxicant Type | Phr. | Hatching 0=None; P=Profuse |
|---|---|---|---|---|
| 305A | Neoprene | TPTC | 8 | 0 |
| 351B | do | TBTO | 12 | 0 |
| 378A | Hycar | TBTO | 6.5 | 0 |
| 389A | Neoprene | TBTO | 7.0 | 0 |
| 389B | do | TBTO | 7.0 | 0 |
| 419A | do | TBTAd | 8.0 | 0 |
| 390B | Butyl | TBTO | 6.5 | 0 |
| 443A | Neoprene | TBTO | 8.0 | 0 |
| 105B | do | TBTO | 6.5 | 0 |
| 705J | do | TBTO | 5.0 | 0 |
| | | Heptachlor | 3.0 | |
| 802D | | TBTF | 8.0 | 0 |
| 802C | | TBTA | 8.0 | 0 |
| 684B | | Chlordane | 4.0 | 0 |
| 1075A | | TBTR | 8.0 | 0 |
| 105A (Control) | | | 0 | P |

The above data indicate a pronounced "Kill" against the eggs. Similar effects are observed with the eggs of midges (chironomid), black flies (simulum pictipes) and horse fly (tabanus).

Contact of the adult (*Culux quinquefasciatus*) mosquito with the vapor arising from compound 443A above, effects a 100% kill in less than 10 minutes. Body lice, cockroaches, termites and adult house flies are similarly dispatched. Termites are not repelled by the rubber and will freely crawl upon it whereby serious physiological disturbances leading to mortality is observed.

EXAMPLE XVIII

Broth cultures of various bacteria and fungi are incubated for 48 hours. Samples of biocidal rubber are placed on petri dishes and subjected to steam sterilization at 15 p.s.i. for 15 minutes. The culture broth is then pipetted into the sterilized petri dishes and culture growth observed for 48 hours.

The following organisms are employed:

| Abbreviation | Organism | Classification |
| --- | --- | --- |
| AN | *Aspergillus niger* | Fungus. |
| RN | *Rhizopus nigricans* | Do. |
| SA | *Staphylococcus albus* | Coccus gm.+. |
| SP | *Streptococcus pyogenes* | Do. |
| EC | *Escherichia coli* | Baccillus gm.−. |
| PA | *Pseusomonas aeruginosa* | Do. |
| AF | *Alcaligenes fecalis* | Do. |
| AA | *Aerobacter aerogenes* | Do. |
| PV | *Proteus vulgaris* | Do. |
| BS | *Bacillus subtillis* | Baccillus gm.+. |
| BM | *Bacillus megaterium* | Do. |
| SM | *Serratia marsciens* | Do. |
| SL | *Streptococcus lactus* | Do. |

Listed below are the biocidal rubbers, employed, toxicant and its concentration in the rubber, and organisms killed (100%/48 hours).

| Rubber code | Toxicant Type | PHR | Effectiveness (100% kills), organism No. |
| --- | --- | --- | --- |
| 105B | TBTO | 6.5 | All, also mixtures of AN, RN, SA, SP, EC, P. |
| 443A | TBTO | 8.0 | All. |
| 819A | TBTO | 5.0 | All. |
| 105A | None | None | None (Control). |

Similarly, 100% kills are shown with all of the above organisms with rubbers containing TBTA (tributyl tin acetate), TPLA (tripropyl lead acetate), and TBTC (tripropyl-tin chloride), "Abate" (O,O,O',O-tetramethyl-O,O'- - thiodi-p-phenylene phosphoroiodate (Cyanamid), and others.

What is claimed is:

1. A biocidal elastomeric composition having a specific gravity at 25° C. greater than 1.0 and comprising a vulcanized elastomeric matrix containing a vulcanizable organic elastomer, from about 0.02 to about 20 parts/wt. per 100 parts/wt. of said elastomer in said matrix of an organic toxicant dissolved in such matrix, and from about 5 to about 100 parts/wt. of a high structure carbon black having an oil absorptivity of at least 9 gals./100 lbs. per 100 parts/wt. of said elastomer in such matrix, said organic toxicant having a low solubility in natural waters, said matrix being vulcanized to an intermediate degree wherein the said matrix is in an essentially elastic condition and wherein said degree of vulcanization and the proportion of said carbon black within the ranges stated being selected to yield a desired rate of release of said toxicant by said composition to its environment.

2. A composition as defined in claim 1 and further characterized by said matrix containing from about 1 to about 5 parts/wt. of a petroleum wax for every 100 parts/wt. of said elastomer in said matrix.

3. A composition as defined in claim 1 and further characterized by said organic toxicant being selected from the class consisting of organotin compounds, organolead compounds, nitrosalicylanilide compounds, and organophosphorous compounds, said composition having at least one dimension of at least 0.05 inch.

4. A composition as defined in claim 1 and further characterized by said composition containing from about 0.5 to about 10 parts/wt. of a $C_{10}$ to $C_{18}$ fatty acid for every 100 parts/wt. of said elastomer and said organic toxicant being a bis(trialkyl tin) oxide.

5. A composition as defined in claim 1 and further characterized by said elastomer being a neoprene rubber.

6. A composition as defined in claim 1 and further characterized by said elastomer being a butyl rubber.

7. A composition as defined in claim 1 and further characterized by said elastomer being a butadiene acrylonitrile synthetic rubber containing from about 10% to about 40%/wt. of combined acrylonitrile.

8. A composition as defined in claim 1 and further characterized by said elastomer being a neoprene rubber, by said organic toxicant being a biocidally-active organotin compound and present in a proportion of from about 1 to about 15 parts/wt. per 100 parts/wt. of said neoprene rubber, and by said carbon black being present in a proportion of from about 10 to about 35 parts/wt. for every 100 parts/wt. of said neoprene rubber in said matrix.

9. A composition as defined in claim 1 and further characterized by said elastomer being a neoprene rubber, by said organic toxicant being a nitrosalicylanilide compound and present in a proportion of from about 1 to about 15 parts/wt. of every 100 parts/wt. of said neoprene rubber, and by said carbon black being present in a proportion of from about 10 to about 35 parts/wt. for every 100 parts/wt. of said neoprene rubber.

10. A composition as defined in claim 1 and further characterized by said elastomer being a neoprene rubber, by said organic toxicant being an organotin compound, by said carbon black being present in a proportion of from about 10 to about 35 parts/wt. for every 100 parts/wt. of said neoprene rubber, and by said composition containing from about 1 to about 8 parts/wt. of palmitic acid.

11. A composition as defined in claim 1 and further characterized by having one dimension greater than 0.05 inch and said elastomer being a neoprene rubber, by said toxicant being bis(tributyl tin) oxide and by being present in a proportion of from about 1 to about 12 parts/wt. for every 100 parts/wt. of said neoprene rubber, and by said carbon black being present in a proportion of from about 10 to about 35 parts/wt. for every 100 parts/wt. of said neoprene rubber.

12. A composition as defined in claim 1 and further characterized by having one dimension greater than 0.05 inch and said elastomer being a neoprene rubber, by said toxicant being bis(tributyl tin) sulfide and is present in a proportion from about 1 to about 12 parts/wt. for every 100 parts/wt. of said neoprene rubber, and said carbon black being present in a proportion of from about 10 to about 35 parts/wt. for every 100 parts/wt. of said neoprene rubber.

13. A composition as defined in claim 1 and further characterized by having one dimension greater than 0.05 inch and said elastomer being a butyl rubber, by said toxicant being bis(tributyl tin) oxide and is present in a proportion of from about 1 to about 12 parts/wt. for every 100 parts/wt. of said butyl rubber and said carbon black being present in a proportion of from about 30 to about 55 parts/wt. for every 100 parts/wt. of said butyl rubber.

14. A composition as defined in claim 1 and further characterized by having one dimension greater than 0.05 inch and said elastomer being a neoprene rubber, by said toxicant being the 2-aminoethanol salt of 5,2'-dichloro-4'-nitrosalicylanilide and is present in a proportion of from about 1 to about 12 parts/wt. for every 100 parts/wt. of said neoprene rubber and said carbon black being present in a proportion of from about 10 to about 35 parts/wt. for every 100 parts/wt. of said neoprene rubber.

15. A composition as defined in claim 1 and further characterized by having one dimension greater than 0.05 inch and said elastomer being a butadiene acrylonitrile synthetic rubber containing from about 15 to about 40%/wt. combined acrylonitrile, by said toxicant being bis (tributyl tin) oxide and is present in a proportion of from about 1 to about 12 parts/wt. for every 100 parts/wt. of said synthetic rubber, and said carbon black being present in a proportion of from about 30 to about 55 parts/wt. for every 100 parts/wt. of said synthetic rubber.

References Cited

UNITED STATES PATENTS

| | | | |
|---|---|---|---|
| 2,810,229 | 10/1957 | Allyn | 43—4.5 |
| 2,970,923 | 2/1961 | Sparmann | 106—15 |
| 3,167,473 | 1/1965 | Leebrick | 260—41 |
| 3,207,593 | 9/1965 | Lundaberry | 71—66 |
| 3,214,279 | 10/1965 | Scott | 106—15 |
| 3,234,032 | 2/1966 | Leebrick | 106—15 |
| 3,062,720 | 11/1962 | Costello | 424—22 |
| 3,212,967 | 10/1965 | McFadden et al. | 106—15 AF |
| 3,239,411 | 3/1966 | Leebrick | 106—15 AF |

MORRIS LIEBMAN, Primary Examiner

S. L. FOX, Assistant Examiner

U.S. Cl. X.R.

106—15 AF; 260—28.5 B, 41.5 R; 424—213, 230, 288, 293